(12) United States Patent
Xhafa et al.

(10) Patent No.: US 11,943,621 B2
(45) Date of Patent: Mar. 26, 2024

(54) SECURE LOCALIZATION IN WIRELESS NETWORKS

(71) Applicant: TEXAS INSTRUMENTS INCORPORATED, Dallas, TX (US)

(72) Inventors: Ariton E. Xhafa, Plano, TX (US); Ram Machness, Plano, TX (US); Minghua Fu, Plano, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/216,919

(22) Filed: Dec. 11, 2018

(65) Prior Publication Data
US 2020/0187010 A1    Jun. 11, 2020

(51) Int. Cl.
*H04W 12/104* (2021.01)
*H04L 1/00* (2006.01)
(Continued)

(52) U.S. Cl.
CPC ......... *H04W 12/104* (2021.01); *H04L 1/0061* (2013.01); *H04L 9/0631* (2013.01); *H04W 4/80* (2018.02); *H04W 12/033* (2021.01); *H04W 12/106* (2021.01); *H04W 12/108* (2021.01); *H04W 12/12* (2013.01); *H04W 64/00* (2013.01); *H04W 80/02* (2013.01)

(58) Field of Classification Search
CPC ............. H04W 12/1004; H04W 12/12; H04W 12/1006; H04W 12/1008; H04W 12/0013; H04W 4/80; H04W 64/00; H04W 80/02; H04W 12/104; H04W 12/106; H04W 12/108; H04W 12/033; H04L 1/0061; H04L 9/0631
See application file for complete search history.

(56) References Cited

U.S. PATENT DOCUMENTS 6,886,103 B1    4/2005  Brustoloni et al.
10,511,939 B1 *  12/2019  Wihardja ................. H04L 27/10
(Continued)

OTHER PUBLICATIONS

Bluetooth, "Bluetooth Core Specification," v5.0, Dec. 6, 2016, 2822 p. (in 31 parts).

*Primary Examiner* — Jasper Kwoh
(74) *Attorney, Agent, or Firm* — Mandy Barsilai Fernandez; Frank D. Cimino (57) ABSTRACT

At least some aspects of the present disclosure provide for a method of data transmission, performed by a wireless device. In some examples, the method includes receiving a localization tone having a first value. The method further includes inserting the localization tone into a data packet at an application layer of a communication protocol stack, the localization tone preceding data of a payload of the data packet and having a last bit immediately preceding a first bit of the data of the payload. The method further includes generating a modified localization tone estimating an effect of processing on the localization tone, wherein the modified localization tone is generated and configured to have the first value after undergoing processing. The method further includes replacing the localization tone in the data packet with the modified localization tone. The method further includes transmitting the data packet.

20 Claims, 3 Drawing Sheets

(51) Int. Cl.
*H04L 9/06* (2006.01)
*H04W 4/80* (2018.01)
*H04W 12/033* (2021.01)
*H04W 12/106* (2021.01)
*H04W 12/108* (2021.01)
*H04W 12/12* (2021.01)
*H04W 64/00* (2009.01)
*H04W 80/02* (2009.01)

(56) References Cited

U.S. PATENT DOCUMENTS

| | | | |
|---|---|---|---|
| 10,531,424 B1* | 1/2020 | Lee | H04W 4/80 |
| 10,587,369 B1* | 3/2020 | Shattil | H04L 27/2602 |
| 2002/0070881 A1* | 6/2002 | Marcarelli | G08G 1/20 |
| | | | 340/988 |
| 2002/0126618 A1* | 9/2002 | Kim | H04L 27/2686 |
| | | | 370/208 |
| 2009/0285396 A1* | 11/2009 | Wong | H04L 9/0819 |
| | | | 707/999.002 |
| 2010/0245154 A1* | 9/2010 | Szajnowski | G01S 7/023 |
| | | | 342/90 |
| 2010/0284310 A1* | 11/2010 | Shaffer | H04L 65/403 |
| | | | 370/260 |
| 2011/0044324 A1* | 2/2011 | Li | G10L 19/0018 |
| | | | 370/352 |
| 2014/0050259 A1* | 2/2014 | Azizi | H04L 27/2657 |
| | | | 375/232 |
| 2014/0161202 A1* | 6/2014 | Gunturi | H04L 27/2623 |
| | | | 375/267 |
| 2015/0117229 A1* | 4/2015 | Avudainayagam | H04L 1/0026 |
| | | | 370/252 |
| 2017/0127304 A1* | 5/2017 | Britt | H04W 4/80 |
| 2018/0160394 A1* | 6/2018 | Reunamaki | H04W 64/00 |
| 2019/0385094 A1 | 12/2019 | Alex et al. | |
| 2020/0021966 A1* | 1/2020 | Wylie | H04W 4/00 |

* cited by examiner

SECURE LOCALIZATION IN WIRELESS NETWORKS

SUMMARY

Aspects of the present disclosure provide for a method of data transmission, performed by a wireless device. In some examples, the method includes receiving a localization tone having a first value. The method further includes inserting the localization tone into a data packet at an application layer of a communication protocol stack, the localization tone preceding data of a payload of the data packet and having a last bit immediately preceding a first bit of the data of the payload. The method further includes generating a modified localization tone estimating an effect of processing on the localization tone, wherein the modified localization tone is generated and configured to have the first value after undergoing processing. The method further includes replacing the localization tone in the data packet with the modified localization tone. The method further includes transmitting the data packet.

Other aspects of the present disclosure provide for an apparatus. In some examples, the apparatus comprises a non-transitory memory storing application instructions and a processor coupled to the non-transitory memory and configured to execute the application instructions. In some examples, executing the application instructions causes the processor to receive a localization tone having a first value and insert the localization tone into a data packet at an application layer of a communication protocol stack, the localization tone preceding data of a payload of the data packet and having a last bit immediately preceding a first bit of the data of the payload. Executing the application instructions further causes the processor to generate a modified localization tone estimating an effect of processing on the localization tone, wherein the modified localization tone is generated and configured to have the first value after undergoing processing, replace the localization tone in the data packet with the modified localization tone, and transmit the data packet.

Other aspects of the present disclosure provide for a method. In some examples, the method includes generating a data packet having a localization tone located in a payload of the data packet, communicating characteristics of transmission of the data packet with a receiving device for the data packet to pre-arrange the characteristics of transmission with the receiving device, and transmitting the data packet to the receiving device.

BRIEF DESCRIPTION OF THE DRAWINGS

For a detailed description of various examples, reference will now be made to the accompanying drawings in which.

DETAILED DESCRIPTION

Some communication protocols include data or processes that facilitate coarse or fine location determination, sometimes referred to as localization, of a device communicating according to the communication protocols. For example, some short-range communication protocols (such as BLUETOOTH®) include tones in at least some data transmissions to enable determination of a location of a device sending a transmission and/or a location of a device receiving a transmission. The tones are, in various examples, data symbols or any other known data without limitation on length. By processing the tones according to angle of departure (AoD) processing (for the device sending the transmission) and/or angle of arrival (AoA) processing (for the device receiving the transmission), a location of the device can be determined. At least some examples of the processing depend on comparing the transmitted tones or the received tones to a known value. For this reason, the tones are often included in a data transmission in plain text, in a manner that is outside of encryption of the data transmission and/or outside of data whitening of the data transmission. However, including the tones as plain text can create security problems in the communications.

For example, when the tones are included as plain text, the location determination becomes susceptible to a man-in-the-middle attack in which a third-party device that is not an intended part of the transmission intercepts the data transmission and then imitates one of the devices that are a part of the transmissions. However, encrypting the tones so that they do not appear as plain text can also create challenges. Particularly, the tones are conventionally appended to the end of a payload pursuant to standards requirements. Advanced Encryption Standard (AES), as one common encryption protocol, encrypts data in blocks of 16 bytes, using each encrypted block as an initialization vector for the next block to be encrypted. This creates an encryption output that is highly random. However, as discussed above, for AoA and/or AoD processing, the tones must be a known value. Therefore, placing the tones in the conventional location, such as at the end of data in the payload when the payload data is not encrypted or following a message authentication code field and/or CRC when the payload is encrypted, in at least some examples, is incompatible with encrypting the payload.

Additionally, as discussed above, the tones must be a known value when received in a transmission for AoA processing. However, the whitening process discussed above alters the data packet to, in some examples, scramble data of the data packet to eliminate or minimize highly redundant data and/or at least partially control an average frequency of the data packet. Accordingly, in some examples the whitening modifies the tones away from the known values and inhibits the ability to perform AoA and/or AoD processing.

At least some aspects of the present disclosure provide for secure localization (e.g., location determination) in short-range communications. In at least some examples, the short-range communications extend to approximately 100 meters (m), 200 m, 300 m, and/or any other distances as specified by an applicable communication standard (e.g., such as a BLUETOOTH® 5.0 standard). To provide the secure localization, some examples incorporate localization tones preceding data in a payload of a data packet (e.g., at the beginning of the payload) of the short-range communications. By including the localization tones at the beginning of the payload, in some examples, encryption of the tones can be predicted based on a known session key and a known initialization vector. Additionally, by performing further prediction and/or estimation, the effects of the whitening process on the tones is mitigated. By estimating an output of the whitening process and the encryption, in some examples the tones are modified according to the estimations prior to the encryption and the whitening such that the tones have the known value when received in a transmission, despite the encryption and the whitening.

Figure 1:
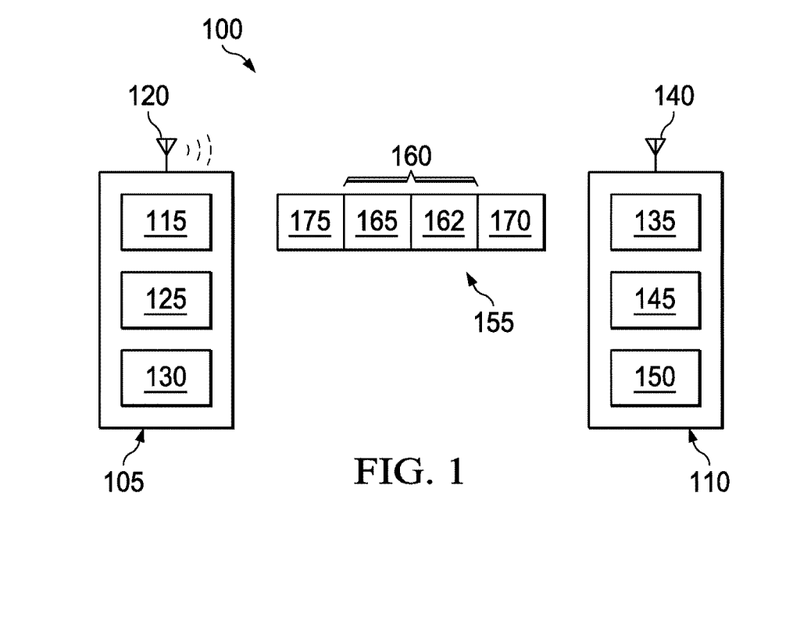
FIG. 1 shows a block diagram of an illustrative system for localization in accordance with various examples.

Turning now to FIG. 1, a block diagram of an illustrative system 100 for localization is shown. The system 100 includes, in some examples, a first wireless device 105 and a second wireless device 110. The first wireless device 105 includes at least a transceiver 115, an antenna 120, a processor 125, and an angle estimator 130. The second wireless device 110 includes at least a transceiver 135, an antenna 140, a processor 145, and an angle estimator 150. The first wireless device 105 and the second wireless device 110 are communicatively coupled via wireless communications, such as via a short-range communication standard (e.g., such as BLUETOOTH® as specified by the Bluetooth Special Interest group). As discussed herein, the first wireless device 105 is the transmitting device and the second wireless device 110 is the receiving device.

In at least some examples, the processor 125 constructs a data packet 155 for transmission to the second wireless device 110. The data packet 155 includes, among other elements, a payload 160 containing data 162 and a localization tone 165, a CRC code 170, and a header 175 (e.g., a media access control (MAC) header). In various examples, the data packet 155 includes further elements (not shown) such as a preamble and/or any other suitable data elements. The processor 125 constructs the data packet 155, in at least some examples, by receiving the data 162 for communication to the second wireless device 110 and obtaining a value for the localization tone 165. While described herein in the singular as a localization tone 165, various examples of the localization tone include any amount of data, symbols, tones, or other suitable contents, the scope of which is not limited herein. The value for the localization tone 165, in some examples, is a known value established by standard and/or communicated previously between the first wireless device 105 and the second wireless device 110. The value for the localization tone 165, in some examples, is the value that the second wireless device 110 expects to receive to perform the AoA processing (e.g., via angle estimator 150). In other examples, the value for the localization tone 165 is the value that the first wireless device 105 expects to receive to perform the AoD processing (e.g., via the angle estimator 130).

In some examples, subsequent processing by the first wireless device 105 to prepare the data packet 155 for transmission will alter the contents of the data packet 155 prior to transmission. For example, whitening and/or encryption will modify the binary sequence of data of the data packet 155 and the second wireless device 110 will reverse the process of whitening and/or encryption upon receipt of the transmitted data packet to obtain the original data 162. In an example, the whitening is performed by performing an exclusive-OR (XOR) logical operation between each bit of an output of a linear feedback shift register (LFSR) (not shown) and each bit of the data to be whitened, generating whitened data. In some examples, before each transmission from the first wireless device 105 (e.g., while forming the data packet 155), the LFSR is initialized with a value. In at least some examples, the value is a portion of a clock signal (e.g., a master BLUETOOTH® clock). The whitening is applied, in some examples, to the payload 160 of the data packet 155, scrambling the contents of the payload 160 in a pseudo-random manner defined by the initialization value of the LFSR. Data whitening, particularly in the context of BLUETOOTH® communication, is a standardized process governed by BLUETOOTH® standards to provide for interoperability among BLUETOOTH® capable devices, and therefore further detail regarding data whitening is not included herein for the sake of brevity and ease of understanding.

To enable the first wireless device 105 to transmit the localization tone 165 to the second wireless device 110 while maintaining the value for the localization tone 165, in some examples the processor 125 estimates an effect of the whitening and/or the encryption on the localization tone 165. The first wireless device 105 performs the estimation, in at least one example, at an application layer of a communication protocol stack of the first wireless device 105. The whitening is performed by the first wireless device 105, in at least one example, at a physical layer of the communication protocol stack. For example, the processor 125 processes the localization tone 165 to estimate an output of the LFSR based on an initial seed value and a bit in the payload 160 at which the localization tone 165 begins. In at least some examples, it is desirable (e.g., necessary under some communication standards, preferred under some operating procedures, efficiently superior to at least some other methods, and/or an optional operational characteristic) for each bit of the localization tone 165 to be a logical "1" value when transmitted by the first wireless device 105, and a sequence of logical "1" values is expected by the second wireless device 110 to perform the AoA processing. To estimate the effects of the whitening to provide for an output of the whitening to be a series of logical "1" values, in some examples the processor 125 performs an XOR operation between a set value of a logical "1" and an estimated output of the LFSR for a specific seed value. The seed value is, in some examples, dependent on an advertising channel (e.g., channel 37, 38, or 39) on which the first wireless device 105 will transmit the data packet 155 and is a defined, standardized value, the scope of which is not limited herein. By performing the XOR operation, the processor 125 determines a value for each bit of the localization tone 165 such that, after the whitening process, the localization tone 165 will retain the known value expected by the second wireless device 110. Prior to performing the whitening process, the processor 125 replaces the known value in the localization tone 165 with the values determined according to the estimation such that, after the estimation and prior to the whitening, the localization tone 165 does not contain the known value.

As discussed above, at least some aspects of the estimation process are channel dependent. However, the first wireless device 105 is capable in various examples of transmitting via a plurality of channels (e.g., such as channels 37, 38, and 39, spanning a range of 2.4 gigahertz (GHz) to 2.46 GHz). Accordingly, estimated values for the localization tone 165 that are estimated for one channel, in some examples, are not automatically usable with other channels, resulting in estimating the values of the localization tone 165 for each channel prior to each transmission. In some examples, to mitigate the need for estimating the localization tone 165 for each channel, the same localization tone 165 is transmitted to each channel. To enable use of the localization tone 165 on a channel for which it was not intended (e.g., a localization tone estimated for channel 37 but transmitted on channel 39), the first wireless device 105, in some examples, notifies the second wireless device 110, prior to transmission of the data packet 155, that the localization tone 165 is estimated for a channel other than the channel on which the data packet 155 is being transmitted.

In other examples, the second wireless device 110 determines that the localization tone 165 is estimated for a channel other than the channel on which the data packet 155 has been received, for example, based at least partially on a marker in the data packet 155. In such examples, the first wireless device 105 inserts a marker in the data packet 155 (e.g., in the header 175, immediately preceding the localization tone 165, or any other suitable location in the data packet 155) indicating that the localization tone 165 is estimated for a channel other than the channel on which the data packet 155 is being transmitted. The marker is subsequently subjected to whitening by the first wireless device 105 such that, after the second wireless device 110 receives the data packet 155 and performs de-whitening, the second wireless device 110 can determine for which channel the localization tone 165 was estimated by the first wireless device 105. In yet another example, the first wireless device 105 estimates a localization tone for each channel and includes each estimated localization tone collectively in the data packet 155 as the localization tone 165. In such examples, the first wireless device 105 further includes data in the data packet 155 indicating a length, beginning bit location, and/or corresponding channel for each individual localization tone of the localization tone 165.

In some examples, the first wireless device 105 and the second wireless device 110 have previously performed authentication protocols (e.g., such as MAC authentication) such that the processor 125 does not encrypt the data packet 155 prior to transmission by the first wireless device 105. However, in other examples, and/or in at least some examples in which authentication has previously been performed, the first wireless device 105 encrypts the data packet 155 prior to transmission. In such examples, the encryption further modifies the contents of the data packet 155 such that the localization tone 165 will no longer have the known value after the encryption. To compensate for this alteration, as with compensating for the whitening, as discussed above, in some examples the first wireless device 105 estimates an effect of the encryption process on the localization tone 165. AES encryption is discussed as an example of encryption herein, though the present disclosure is not limited to this sole encryption protocol and similar estimation of the effects of other encryption protocols is contemplated by the present disclosure.

As discussed above, AES begins with a session key, an initialization vector, and a first block of data to be encrypted. The encrypted first block of data is then used as the initialization vector for encrypting a second block of data, the second block of data is used as the initialization vector for encrypting a third block of data, and so forth until the data is fully encrypted. This provides for a highly random result for the encrypted data. However, to estimate or control the output of the encryption, in at least some examples each of the initialization vector, the session key, and the data to be encrypted must be known. For this reason, in at least some encryption examples, an encryption output estimation can only be determined for a block of data for which values of the block of data, desired values for the encrypted data, the session key, and the initialization vector are known. Accordingly, in at least some examples, the localization tone 165 is positioned in the payload 160 preceding the data 162, when any data 162 is included in the payload 160, to facilitate estimation of values of the encrypted localization tone 165. For example, to determine a value to be used as the localization tone 165, in some examples a calculation of Decrypt_AES(IV,SK,array(bit_i)) is used, where Decrypt_AES is an established algorithm according to the AES encryption protocol, IV is the initialization vector, SK is the session key, and bit_i is the data to be encrypted. In some examples, bit_i represents the output of the whitening estimation, discussed above. In other examples, bit_i represents the known value. In some examples, both the whitening estimation discussed above and the encryption estimation are performed to determine the localization tone 165 (e.g., whitening estimation followed by encryption estimation, or vice versa), while in other examples only one of the whitening estimation or the encryption estimation is performed. In at least some examples, to facilitate ease of processing by the second wireless device 110, a length of the localization tone 165 is equal to a multiple of the block size of the encryption process used to encrypt the data packet 155.

In some examples, rather than positioning the localization tone 165 before the data 162 in the payload 160, as shown in FIG. 1, the localization tone is located in another portion of the data packet 155, such as (although not shown) following the cyclic redundancy check (CRC) block 170. In such examples, the localization tone 165 is neither encrypted nor a part of an authenticated portion of the data packet 155, again exposing the localization tone 165 to vulnerability from malicious actors. In these examples, there are limited options available for securing the localization tone 165. An example of one option for securing the localization tone 165 includes incorporating additional processing logic into the first wireless device 105 and/or the second wireless device 110 to prevent data from repeat data packets from being used for localization. For example, if a first data packet 155 has been received by the second wireless device 110 and then the second wireless device 110 receives a repeat transmission of the data packet 155, the second wireless device 110 will use only data from the first received data packet 155 for localization. Such a solution involves, in some examples, prior knowledge of the security scheme and software and/or hardware modifications to the second wireless device 110. Another example of an option for securing the localization tone 165 includes the first wireless device 105 negotiating and/or agreeing prior to transmission of the data packet 155 that authentication of the payload 160 (e.g., via the header 175) also applied to the localization tone 165, regardless of the location of the localization tone 165 in the data packet 155.

At least some of the above examples provide for securing localization tones used for localization of wireless devices. Such securing of the localization protects against actions of malicious actors, such as man-in-the-middle attacks, that is presently unavailable in the art while conforming with at least some standards requirements to facilitate backwards compatibility (e.g., by continuing to provide a signal expected by a receiving device for localization despite processing performed on the signal pursuant to at least some of the examples disclosed herein).

Figure 2:
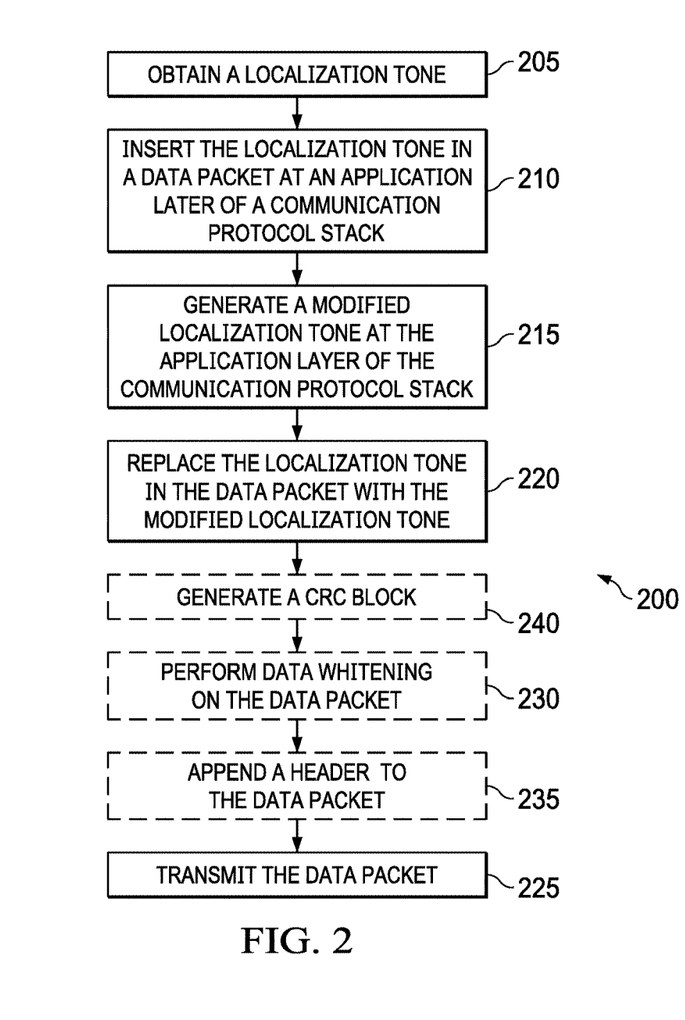
FIG. 2 shows a flowchart of an illustrative method in accordance with various examples.

Referring now to FIG. 2, a flowchart of an illustrative method 200 is shown. In at least some examples, the method 200 is a method for generating a data packet including a localization tone. The method 200 is implemented, in at least some examples, by a wireless device, such as the first wireless device 105, discussed above with respect to FIG. 1. For example, a processor, such as the processor 125, discussed above with respect to FIG. 1, implements and/or performs at least some operations of the method 200.

At operation 205, a localization tone is obtained. The localization tone, in at least some examples, has the known value discussed above and expected by a receiving device to enable the receiving device to perform localization according to the localization tone. In at least one example, the localization tone comprises or includes a plurality of digital logic "1" values such that the localization tone can be said to be a signal of "all 1's." The localization tone may have any suitable length, the scope of which is not limited herein. In at least some examples, the localization tone has a length optimized for encryption, such as a length that is an integer multiple of a block size of the encryption, as discussed herein. A source of the localization tone is not limited herein. For example, the localization tone may be generated by the wireless device, retrieved from a storage device by the wireless device, or received by the wireless device from another device.

At operation 210, the localization tone is inserted into a data packet at an application layer of a communication protocol stack. In at least some examples, the localization tone is inserted into the data packet preceding payload data of the data packet. For example, the localization tone is inserted into the payload of the data packet, where a first bit of the localization tone is the first bit of the payload, the last bit of the localization tone immediately precedes the first bit of the payload data, and the last bit of the payload data is the last bit of the payload. In at least some examples, positioning the localization tone at the beginning of the payload and preceding the payload data provides an improvement over positioning the localization tone elsewhere in the payload or in the data packet. For example, positioning the localization tone at the beginning of the payload and preceding the payload data enables encryption of the localization tone that, in at least some examples, is not otherwise possible if the localization tone is located elsewhere in the data packet following preceding data. However, positioning the localization tone at the beginning of the payload and preceding the payload data creates an additional technical problem in maintaining the localization tone as the known value when the data packet is transmitted, despite processing being performed on the payload (including the localization tone) that alters the processed data and that would not be performed on the localization tone if the localization tone were located outside of the payload (e.g., after a CRC code of the data packet).

At operation 215, a modified localization tone is generated at the application layer of a communication protocol stack. The modified localization tone is generated, in some examples, to compensate for at least some effects of the processing that the localization tone is subjected to because of its inclusion in the payload of the data packet. For example, when located after the CRC code of the data packet, the localization tone would not be subject to data whitening. However, when located in the payload of the data packet, the localization tone is subject to data whitening that, in at least some circumstances, will modify values of the localization tone away from the known value, thereby rendering the localization inoperable for use in performing localization. Accordingly, to solve this technical problem with repositioning the localization tone to secure the localization tone, the effects of the data whitening are estimated and the modified localization tone is generated, changing the contents of the modified localization tone away from the known value such that, after modification due to data whitening, the whitened modified localization tone returns to the known value.

In at least some examples, the effects of the data whitening are estimated by performing an XOR operation between the data of the localization tone (e.g., the known value) and an output of a LFSR. The output of the LFSR, in some examples, is based on a seed value loaded into the LFSR, where the seed value is a defined value depending on an advertising channel on which the data packet will be transmitted. A result of the XOR operation, in at least some examples, is the modified localization tone. For example, a first bit of the localization tone XOR'd with a first output bit of the LFSR becomes a first bit of the modified localization tone, a second bit of the localization tone XOR'd with a second output bit of the LFSR becomes a second bit of the modified localization tone, and so forth.

At operation 220, the localization tone is replaced in the data packet by the modified localization tone. In at least some examples, an application or other service operating at the application layer of the communication protocol stack replaces the localization tone with the modified localization tone.

At operation 225, the data packet is transmitted to a receiving device. The data packet is transmitted, in some examples via a transceiver of the wireless device. In at least some examples, the transmitted data packet includes the known value, for example, beginning at a first bit of the payload of the data packet.

In at least some examples, the method 200 further includes operation 230. Operation 230 is, in some examples, performed after operation 220 and prior to operation 225. At operation 230, data whitening is performed. The data whitening is performed, in at least some examples, according to standardized and/or defined procedures, the scope of which is not limited herein. For example, the data whitening is performed according to a BLUETOOTH® standard such that the data packet having the data whitening is capable of being processed by devices that operate according to the BLUETOOTH® standard. In at least some examples, the BLUETOOTH® standard is the BLUETOOTH® 5.0 standard, as specified by the BLUETOOTH® Special Interest Group, or any subsequent BLUETOOTH® standard incorporated in, incorporating, or expanding upon the BLUETOOTH® 5.0 standard. In at least some examples, the data whitening alters a value of the modified localization tone from values generated according to operation 215 and inserted into the data packet at operation 210 to the known value expected by a device receiving the data packet (e.g., such as the value of the localization tone received at operation 205).

In at least some examples, the method 200 further includes operation 235. Operation 235 is, in some examples, performed after operation 230 and prior to operation 225. At operation 235, a header is appended to the data packet. In some examples, the header is a MAC header. The header, in at least some examples, includes any one or more of an address field, a type field, one or more flag bits (e.g., flow, acknowledgement, and/or sequence flag bits), and/or a checksum field. In other examples, the header contains any suitable information as defined by an applicable communication standard or protocol, the scope of which is not limited herein. In at least some examples, contents of the header are defined according to the BLUETOOTH® standard.

In at least some examples, the method 200 further includes operation 240. Operation 240 is, in some examples, performed after operation 220 and prior to operation 230. At operation 240, a CRC code is generated. The CRC code is, in some examples, a numerical value determined according to a polynomial division of a remainder of the data packet. For example, the CRC code is a remainder obtained by performing a polynomial division, or other mathematic manipulation, equation, or algorithm, on the data packet. In at least some examples, a device receiving the data packet performs the same polynomial division, or other mathematic manipulation, equation, or algorithm and compares the remainder obtained during that process to the CRC code included in the data packet to perform error detection on the data packet.

Figure 3:
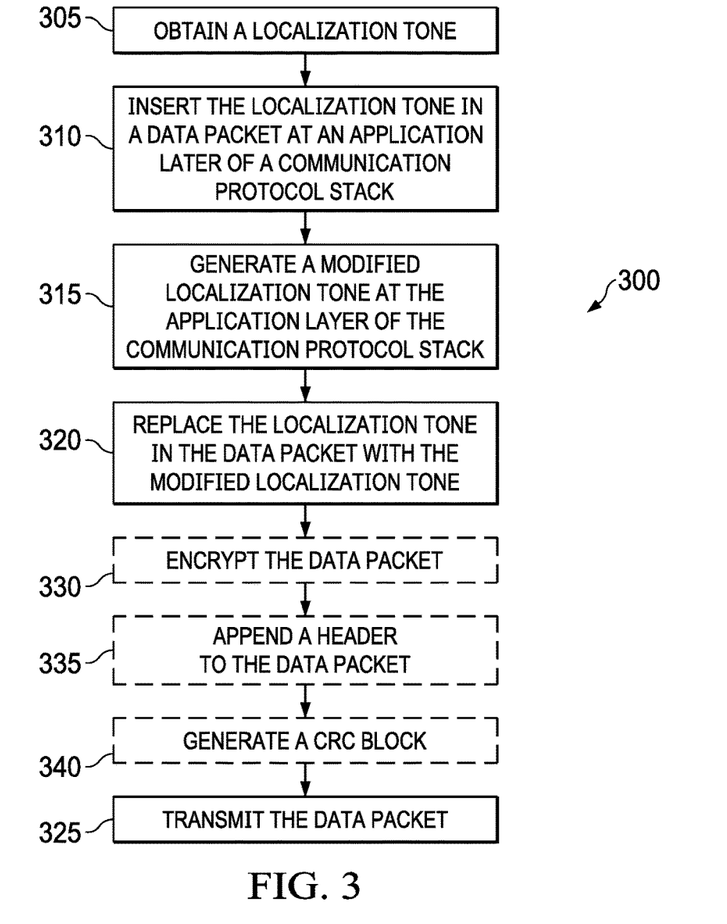
FIG. 3 shows a flowchart of an illustrative method in accordance with various examples.

Referring now to FIG. 3, a flowchart of an illustrative method 300 is shown. In at least some examples, the method 300 is a method for generating a data packet including a localization tone. The method 300 is implemented, in at least some examples, by a wireless device, such as the first wireless device 105, discussed above with respect to FIG. 1. For example, a processor, such as the processor 125, discussed above with respect to FIG. 1, implements and/or performs at least some operations of the method 300. Additionally, at least some aspects of the method 300 are suitable for combination with the method 200, as discussed in greater detail below, for example, where redundant operations of the method 200 and the method 300 are omitted and unique operations from one of the method 200 or method 300 are added to the other of the method 200 or the method 300.

At operation 305, a localization tone is obtained. The localization tone, in at least some examples, has the known value, such as previously described above with respect to operation 205 of method 200 of FIG. 2.

At operation 310, the localization tone is inserted into a data packet at an application layer of a communication protocol stack. In at least some examples, the localization tone is inserted into the data packet preceding payload data of the data packet. For example, the localization tone is inserted into the payload of the data packet, where a first bit of the localization tone is the first bit of the payload, the last bit of the localization tone immediately precedes the first bit of the payload data, and the last bit of the payload data is the last bit of the payload. In at least some examples, positioning the localization tone at the beginning of the payload and preceding the payload data facilitates encryption of the localization tone in a manner not otherwise possible if the localization tone is positioned elsewhere in the payload or the data packet.

At operation 315, a modified localization tone is generated at the application layer of a communication protocol stack. The modified localization tone is generated, in some examples, to compensate for at least some effects of the processing that the localization tone is subjected to during an encryption process. For example, when the localization tone is located outside of the payload, the localization tone is not subjected to encryption. However, when located in the payload of the data packet, the localization tone is subject to encryption that, in at least some circumstances, modifies values of the localization tone away from the known value, thereby rendering the localization inoperable for use in performing localization.

In at least some examples, the effects of the encryption are estimated by calculating Decrypt_AES(IV,SK,array(bit_i)), where Decrypt_AES is an established algorithm according to the AES encryption protocol, IV is the initialization vector, SK is the session key, and bit_i is the data to be encrypted (e.g., the input to operation 315). A result of the Decrypt_AES operation, in at least some examples, is the modified localization tone. For example, a first bit of the result of the Decrypt_AES operation becomes a first bit of the modified localization tone, a second bit of the result of the Decrypt_AES operation becomes a second bit of the modified localization tone, and so forth. In other examples, such as when AES encryption is not used, the effects of the encryption are estimated according to any other suitable means for the form of encryption employed.

At operation 320, the localization tone is replaced in the data packet by the modified localization tone. In at least some examples, an application or other service operating at the application layer of the communication protocol stack replaces the localization tone with the modified localization tone.

In various examples, operation 315 and operation 320 are suitable for inclusion in method 200 of FIG. 2. For example, operation 315 and operation 320 are suitable for implementation following operation 220 and preceding the remaining operations of method 200. In such an example, the modified localization tone that has been modified to compensate for effects of data whitening is used as an input to operation 315 (the "localization tone" of operation 315) and the modified localization tone referenced in the remainder of method 200 is an output of operation 320 (the "modified localization tone" of operation 320). In another example, operation 315 and operation 320 are suitable for implementation prior to operation 215 of method 200. In such an example, the localization tone of operation 315 is the localization tone inserted into the data packet at operation 210 of method 200 and the modified localization tone inserted into the data packet at operation 320 is the "localization tone" of operation 215 of method 200.

At operation 325, the data packet is transmitted to a receiving device. The data packet is transmitted, in some examples via a transceiver of the wireless device. In at least some examples, the transmitted data packet includes the known value, for example, beginning at a first bit of the payload of the data packet.

In at least some examples, the method 300 further includes operation 330. Operation 330 is, in some examples, performed after operation 320 and prior to operation 325. At operation 330, encryption is performed. The encryption is performed, in at least some examples, according to standardized and/or defined procedures, the scope of which is not limited herein. For example, the encryption is performed according to an AES standard such that the data packet having the encryption complies with AES security protocols or requirements and is suitable for decryption based on AES decryption schemes. In at least some examples, the encryption alters a value of the modified localization tone from values generated according to operation 315 and inserted into the data packet at operation 310 to the known value expected by a device receiving the data packet (e.g., such as the value of the localization tone received at operation 305).

In at least some examples, the method 300 further includes operation 335. Operation 335 is, in some examples, performed after operation 330 and prior to operation 325. At operation 335, a header is appended to the data packet, for example, as described above with respect to operation 235 of method 200 of FIG. 2.

In at least some examples, the method 300 further includes operation 340. Operation 340 is, in some examples, performed after operation 335 and prior to operation 325. At operation 340, a CRC code is generated, for example, as described above with respect to operation 240 of FIG. 2.

Figure 4:
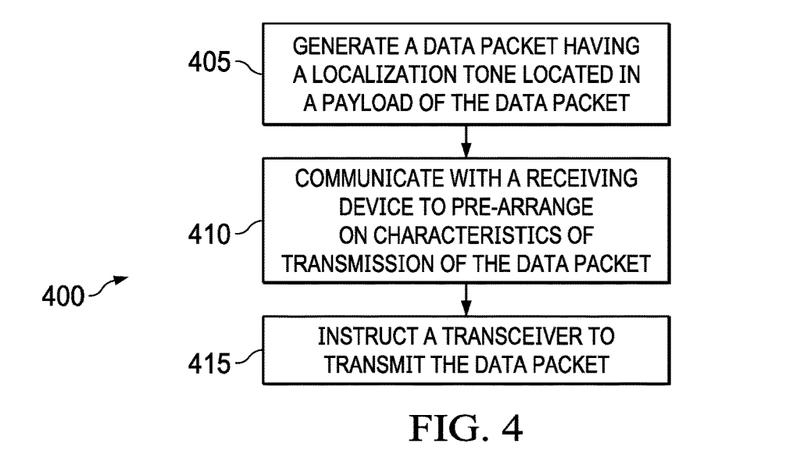
FIG. 4 shows a flowchart of an illustrative method in accordance with various examples.

Referring now to FIG. 4, a flowchart of an illustrative method 400 is shown. In at least some examples, the method 400 is a method of communicating a data packet having a localization tone located in a payload of the data packet and estimated to compensate for processing of the payload. The method 400 is implemented, in at least some examples, by a wireless device, such as the first wireless device 105, discussed above with respect to FIG. 1. For example, a processor, such as the processor 125, discussed above with respect to FIG. 1, implements and/or performs at least some operations of the method 400.

At operation 405, the processor generates the data packet having the localization tone located in the payload of the data packet. The data packet is generated, in at least some examples, to compensate for effects of data whitening and/or encryption of the payload on the localization tone to maintain the localization tone, after data whitening and/or encryption, as the known value during transmission. For example, the processor generates the data packet according to the method 200, described above with respect to FIG. 2, and/or the method 300, described above with respect to FIG. 3.

At operation 410, the processor communicates with a receiving device to pre-arrange and/or agree on characteristics of transmission of the data packet. For example, the processor communicates with the receiving device to inform the receiving device that the localization tone included in the data packet is estimated for a first communication channel and the data packet is being (or will be) transmitted on a second communication channel. In at least some examples, transmitting the data packet having the localization tone estimated for the first communication channel while the data packet is transmitted on the second communication channel improves functioning and processing of the wireless device including the processor by reducing processing performed by the processor when the data packet is transmitted on a communication channel other than the first communication channel.

In other examples, the communication with the receiving device informs the receiving device that a header (e.g., a MAC header) of the data packet includes authentication that encompasses the localization tone (e.g., when the localization tone follows a CRC code of the data packet).

At operation 415, the processor instructs a transceiver to transmit the data packet, causing the transceiver to transmit the data packet according to criteria received from the processor. The criteria include, for example, a transmission strength, a communication channel, or any other suitable criteria for controlling transmission of a data packet.

Figure 5:
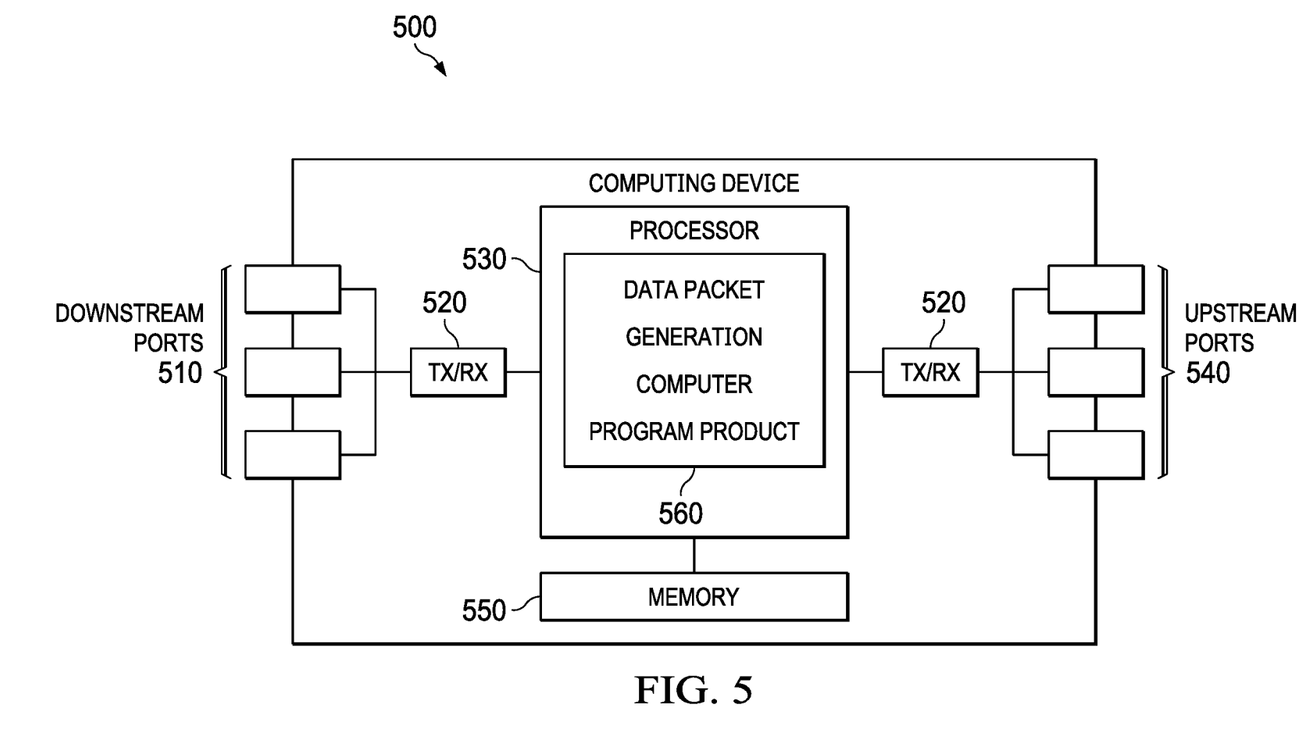
FIG. 5 shows a block diagram of an illustrative user equipment in accordance with various examples.

Referring now to FIG. 5, a block diagram of an illustrative user equipment 500 is shown. In at least some examples, the user equipment 500 is any device suitable for implementation as the first wireless device 105 and/or the second wireless device 110, each of FIG. 1, and suitable for performing at least some of the operations prescribed thereto. In at least some examples, the user equipment 500 is further suitable and/or configured for implementing at least some of the method 200, method 300, and/or method 400, described above.

User equipment 500 is a device (e.g., a computer system, a user equipment, a mobile phone, a beacon, a tablet device, a wearable device, etc.) that generates and transmits a data packet to another computing device, where the data packet includes a localization tone. For example, in at least some embodiments, the user equipment 500 is at least partially implemented as a wireless device configured to estimate and compensate for effects of data whitening and/or encryption on a localization tone included in a payload of a data packet, as described with respect to system 100, method 200, method 300, and/or method 400 for example, according to a computer program product executed on, or by, at least one processor.

The user equipment 500 comprises one or more input devices 510. Some of the input devices 510 can include microphones, keyboards, touchscreens, buttons, toggle switches, cameras, sensors, and/or other devices that allow a user to interact with, and provide input to, the user equipment 500. Some other of the input devices 510 can include downstream ports coupled to a transceiver (Tx/Rx) 520, which are transmitters, receivers, or combinations thereof. The Tx/Rx 520 transmits and/or receives data to and/or from other computing devices via at least some of the input devices 510. Similarly, the user equipment 500 comprises a plurality of output devices 540. Some of the output devices 540 can include speakers, a display screen (which may also be an input device such as a touchscreen), lights, or any other device that allows a user to interact with, and receive output from, the user equipment 500. At least some of the output devices 540 can include upstream ports coupled to another Tx/Rx, wherein the Tx/Rx 520 transmits and/or receives data from other nodes via the upstream ports. The downstream ports and/or the upstream ports can include electrical and/or optical transmitting and/or receiving components. In another embodiment, the user equipment 500 comprises one or more antennas (not shown) coupled to the Tx/Rx 520. The Tx/Rx 520 transmits and/or receives data from other computing or storage devices wirelessly via the one or more antennas.

A processor 530 is coupled to the Tx/Rx 520 and at least some of the input devices 510 and/or the output devices 540 and is configured to generate data packets including localization tone compensated for effects of processing that alter values of the localization tones prior to transmission. In an embodiment, the processor 530 comprises one or more multi-core processors and/or memory modules 550, which functions as data stores, buffers, etc. The processor 530 is implemented as a general processor or as part of one or more application specific integrated circuits (ASICs), field-programmable gate arrays (FPGAs), and/or digital signal processors (DSPs). Although illustrated as a single processor, the processor 530 is not so limited and alternatively comprises multiple processors. The processor 530 further comprises processing logic configured to execute a data packet generation computer program product 560 that is configured to generate a data packet as described with respect to system 100, method 200, method 300, and/or method 400, discussed above. In at least some examples, the data packet generation computer program product 560 generates the data packet by replacing a localization tone of the data packet with a modified localization known not having a value expected by a receiving device to compensate for effects of data whitening and/or encryption on the data packet.

FIG. 5 also illustrates that a memory module 550 is coupled to the processor 530 and is a non-transitory medium configured to store various types of data. Memory module 550 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 550 can also be used to house the instructions for carrying out the various embodiments described herein. For example, the memory module 550 may comprise the data packet generation computer program product 560, which is executed by processor 530.

It is understood that by programming and/or loading executable instructions onto the user equipment 500, at least one of the processor 530 and/or the memory module 550 are changed, transforming the user equipment 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components or connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., field effect transistor (FET), metal oxide semiconductor FET (MOSFET), n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A method of data transmission, performed by a wireless device, the method comprising:
    determining a first value for a localization tone;
    inserting the first value of the localization tone into a data packet;
    generating a modified localization tone such that, after whitening and encrypting, the modified localization tone returns to the first value;
    inserting the modified localization tone into the data packet at an application layer of a communication protocol stack, the modified localization tone preceding data of a payload of the data packet and having a last bit immediately preceding a first bit of the data of the payload, wherein the inserting the modified localization tone in the data packet comprises replacing the first value of the localization tone in the data packet with the modified localization tone;
    whitening the data packet after inserting the modified localization tone into the data packet;
    encrypting the data packet after inserting the modified localization tone into the data packet; and
    transmitting the data packet after the whitening and the encrypting the data packet.

2. The method of claim 1, wherein the generating the modified localization tone comprises, for each bit of the localization tone:
    performing an exclusive-OR operation of a constant value and an estimated output of a linear feedback shift register based on a respective bit of the localization tone being considered and a position of that respective bit of the localization tone in the data packet.

3. The method of claim 1, wherein the generating the modified localization tone comprises performing Decrypt_AES(IV,SK,array(bit_i)), wherein Decrypt_AES is an established algorithm according to the Advanced Encryption Standard (AES) encryption protocol, IV is an initialization vector, SK is a session key, and bit_i is the localization tone.

4. The method of claim 1, wherein before transmitting the data packet the method further comprises:
appending a header to the encrypted data packet, the header preceding the modified localization tone;
generating a cyclic redundancy check (CRC) code; and
appending the CRC code to an end of the data packet, wherein the whitening the data packet comprises performing a summation of each bit of the data packet with an output of a linear feedback shift register having an initial seed value.

5. The method of claim 4, wherein the transmitting the data packet comprises transmitting the data packet on an advertising channel, and wherein the initial seed value is based on the advertising channel.

6. The method of claim 1, wherein transmitting the data packet comprises transmitting the data packet to a receiving device, and wherein the localization tone is used by the receiving device to determine an angle of arrival.

7. The method of claim 1, wherein the encrypting the data packet is based on an encryption process, and wherein the method further comprises setting a length of the localization tone to be equal to a multiple of a block size of the encryption process.

8. A method of data transmission, performed by a wireless device, the method comprising:
determining a first value for a localization tone;
generating a modified localization tone such that, after whitening and encrypting, the modified localization tone returns to the first value;
inserting the modified localization tone into a data packet at an application layer of a communication protocol stack, the modified localization tone preceding data of a payload of the data packet and having a last bit immediately preceding a first bit of the data of the payload;
whitening the data packet after inserting the modified localization tone into the data packet;
encrypting the data packet after inserting the modified localization tone into the data packet; and
transmitting the data packet after the whitening and the encrypting the data packet, wherein the generating the modified localization tone comprises:
performing Decrypt_AES(IV,SK,array(bit_i)), wherein Decrypt_AES is an established algorithm according to the Advanced Encryption Standard (AES) encryption protocol, IV is an initialization vector, SK is a session key, and bit_i is the localization tone, and
for each bit of the modified localization tone:
estimating an output of a linear feedback shift register; and
performing an exclusive-OR operation of a constant value and the estimated output of the linear feedback shift register based on a respective bit of the modified localization tone being considered and a position of that respective bit of the modified localization tone in the data packet.

9. An apparatus, comprising:
a non-transitory memory storing application instructions; and
a processor coupled to the non-transitory memory and configured to execute the application instructions to cause the processor to:
determine a first value for a localization tone;
insert the first value of the localization tone into a data packet;
generate a modified localization tone such that, after whitening and encrypting, the modified localization tone returns to the first value;
insert the modified localization tone into the data packet at an application layer of a communication protocol stack, the modified localization tone preceding data of a payload of the data packet and having a last bit immediately preceding a first bit of the data of the payload, wherein to insert the modified localization tone in the data packet, the processor is configured to replace the first value of the localization tone in the data packet with the modified localization tone;
whiten the data packet after inserting the modified localization tone into the data packet;
encrypt the data packet after inserting the modified localization tone into the data packet; and
transmit the data packet after the whitening and the encrypting the data packet.

10. The apparatus of claim 9, wherein to generate the modified localization tone, for each bit of the localization tone, the processor is further configured to:
perform an exclusive-OR operation of a constant value and an estimated output of a linear feedback shift register based on a respective bit of the localization tone being considered and a position of that respective bit of the localization tone in the data packet.

11. The apparatus of claim 9, wherein to generate the modified localization tone, the processor is further configured to perform a Decrypt_AES(IV,SK,array(bit_i)) process, wherein Decrypt_AES is an established algorithm according to the Advanced Encryption Standard (AES) encryption protocol, IV is an initialization vector, SK is a session key, and bit_i is the localization tone.

12. The apparatus of claim 9, wherein, before transmitting the data packet, executing the application instructions further configures the processor to:
append a header to the encrypted data packet, the header preceding the modified localization tone;
generate a cyclic redundancy check (CRC) code; and
append the CRC code to an end of the data packet, wherein to perform the whitening, the processor is configured to perform a summation of each bit of the data packet with an output of a linear feedback shift register having an initial seed value.

13. The apparatus of claim 12, wherein transmitting the data packet comprises transmitting the data packet on an advertising channel, and wherein the initial seed value is based on the advertising channel.

14. An apparatus, comprising:
a non-transitory memory storing application instructions; and
a processor coupled to the non-transitory memory and configured to execute the application instructions to cause the processor to:
determine a first value for a localization tone;
generate a modified localization tone such that, after whitening and encrypting, the modified localization tone returns to the first value;
insert the modified localization tone into a data packet at an application layer of a communication protocol stack, the modified localization tone preceding data of a payload of the data packet and having a last bit immediately preceding a first bit of the data of the payload;

whiten the data packet after inserting the modified localization tone into the data packet;
encrypt the data packet after inserting the modified localization tone into the data packet; and
transmit the data packet after the whitening and the encrypting the data packet, wherein to generate the modified localization tone comprises, the processor is further configured to:
perform a Decrypt_AES(IV,SK,array(bit_i)) process, wherein Decrypt_AES is an established algorithm according to the Advanced Encryption Standard (AES) encryption protocol, IV is an initialization vector, SK is a session key, and bit_i is the localization tone, and
for each bit of the modified localization tone,
estimate an output of a linear feedback shift register, and
perform an exclusive-OR operation of a constant value and the estimated output of the linear feedback shift register based on a respective bit of the modified localization tone being considered and a position of that respective bit of the modified localization tone in the data packet.

15. A method, comprising:
determining a first value for a localization tone;
generating a modified localization tone such that, after whitening and encrypting, the modified localization tone returns to the first value;
inserting the modified localization tone into a data packet at an application layer of a communication protocol stack, the modified localization tone preceding data of a payload of the data packet and having a last bit immediately preceding a first bit of the data of the payload;
whitening the data packet after inserting the modified localization tone into the data packet;
encrypting the data packet after inserting the modified localization tone into the data packet;
communicating characteristics of transmission of the data packet with a receiving device for the data packet to pre-arrange the characteristics of transmission with the receiving device; and
transmitting the data packet to the receiving device after the whitening and the encrypting the data packet, wherein the generating the modified localization tone comprises:
performing Decrypt_AES(IV,SK,array(bit_i)), wherein Decrypt_AES is an established algorithm according to the Advanced Encryption Standard (AES) encryption protocol, IV is an initialization vector, SK is a session key, and bit_i is the localization tone, and
for each bit of the modified localization tone:
estimating an output of a linear feedback shift register, and
performing an exclusive-OR operation of a constant value and the estimated output of the linear feedback shift register based on a respective bit of the modified localization tone being considered and a position of that respective bit of the modified localization tone in the data packet.

16. The method of claim 15, further comprising:
appending a header to the encrypted data packet, the header preceding the modified localization tone;
generating a cyclic redundancy check (CRC) code; and
appending the CRC code to an end of the data packet, wherein the whitening the data packet comprises performing a summation of each bit of the data packet with an output of the linear feedback shift register having an initial seed value.

17. The method of claim 16, wherein the transmitting the data packet comprises transmitting the data packet on an advertising channel, and wherein the initial seed value is based on the advertising channel.

18. The method of claim 15, wherein the encrypting the data packet is based on an encryption process, and wherein the method further comprises setting a length of the localization tone to be equal to a multiple of a block size of the encryption process.

19. A method of data transmission, performed by a wireless device, the method comprising:
determining a first value for a localization tone;
generating a modified localization tone such that, after whitening and encrypting, the modified localization tone returns to the first value;
inserting the modified localization tone into a data packet at an application layer of a communication protocol stack, the modified localization tone preceding data of a payload of the data packet and having a last bit immediately preceding a first bit of the data of the payload;
whitening the data packet after inserting the modified localization tone into the data packet;
encrypting the data packet after inserting the modified localization tone into the data packet; and
transmitting the data packet after the whitening and the encrypting the data packet, wherein the encrypting the data packet is based on an encryption process, and wherein the method further comprises setting a length of the localization tone to be equal to a multiple of a block size of the encryption process.

20. An apparatus, comprising:
a non-transitory memory storing application instructions; and
a processor coupled to the non-transitory memory and configured to execute the application instructions to cause the processor to:
determine a first value for a localization tone;
generate a modified localization tone such that, after whitening and encrypting, the modified localization tone returns to the first value;
insert the modified localization tone into a data packet at an application layer of a communication protocol stack, the modified localization tone preceding data of a payload of the data packet and having a last bit immediately preceding a first bit of the data of the payload;
whiten the data packet after inserting the modified localization tone into the data packet;
encrypt the data packet after inserting the modified localization tone into the data packet; and
transmit the data packet after the whitening and the encrypting the data packet, wherein executing the application instructions configures the processor to:
encrypt the data packet using an encryption process, and
set a length of the localization tone to be equal to a multiple of a block size of the encryption process.

* * * * *